June 7, 1938.   S. J. VOUCH ET AL   2,120,207
BRAKING SYSTEM
Filed Feb. 25, 1936
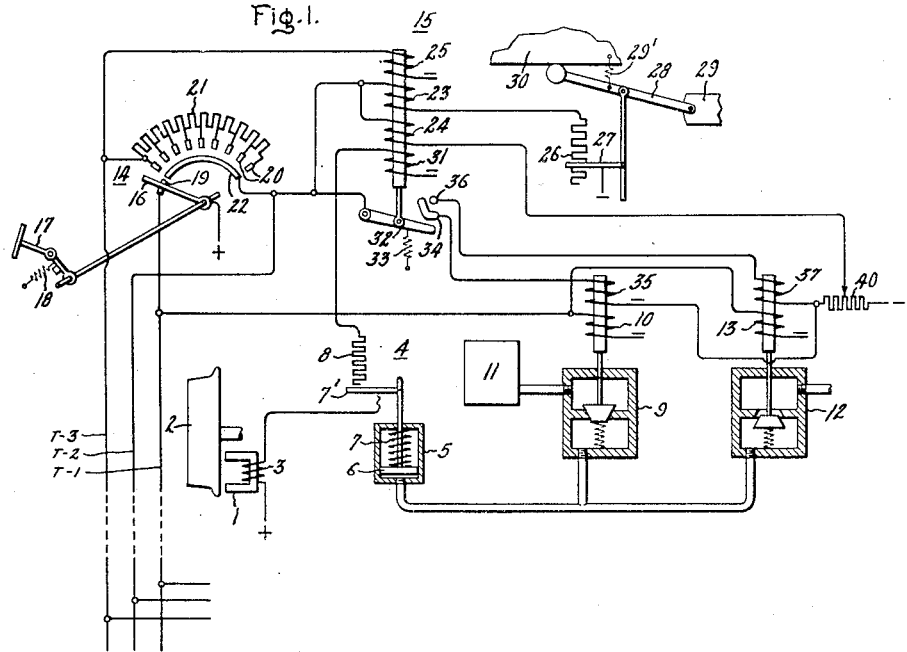
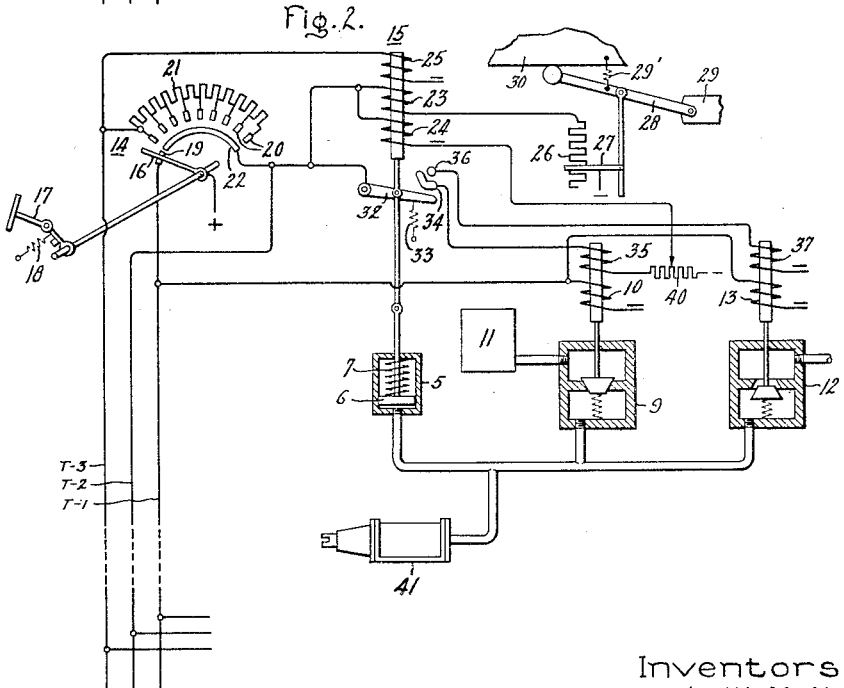
Inventors:
Jacob W. McNairy,
Stephen J. Vouch,
by Harry E. Dunham
Their Attorney.

Patented June 7, 1938

2,120,207

UNITED STATES PATENT OFFICE 2,120,207

BRAKING SYSTEM

Stephen J. Vouch and Jacob W. McNairy, Erie, Pa., assignors to General Electric Company, a corporation of New York Application February 25, 1936, Serial No. 65,589

11 Claims. (Cl. 188—195)

Our invention relates to braking systems and particularly to systems for automatically regulating the braking effect produced on each vehicle of a multiple unit train in accordance with the load on the vehicle, and one object of our invention is to provide a simple and inexpensive regulating arrangement for accomplishing this result.

In accordance with our invention, we provide each vehicle of the train with a regulator which automatically maintains for each position of a manually controlled brake lever controlled by the motorman a predetermined braking effect proportional to the load on the vehicle. This regulator includes a device which, when the brake lever is moved to a brake application position, effects the operation of the braking apparatus to produce and maintain a predetermined braking effect which depends upon the position of the brake lever and the load on the vehicle.

Our invention will be better understood from the following description when taken in connection with the accompanying drawing, in which Fig. 1 diagrammatically illustrates a braking system employing our improved regulating arrangement, and Fig. 2 illustrates a modification of the arrangement shown in Fig. 1, and the scope of our invention will be pointed out in the appended claims.

Referring to Fig. 1, the braking system shown is an eddy current brake for one of the vehicles of a multiple unit train including a magnet 1 which, when energized, produces a braking effect on a wheel 2, of the vehicle or some other suitable magnetic member, attached to the rotatable portion of the vehicle to be stopped. The braking effect obviously depends upon the magnitude of the current through the energizing winding 3 of magnet 1.

In accordance with our invention, the amount of current through the magnet 3 is controlled by a fluid pressure operated rheostat 4 which includes a fluid pressure operated cylinder 5, a piston 6 and a spring 7 in the cylinder 5, and a movable contact 7' attached to the piston 6 and arranged to engage various points on a fixed resistor 8 as the fluid pressure in the cylinder 5 is varied. For controlling the fluid pressure in the cylinder 5, we provide an electromagnetically operated application valve 9 having an operating winding 10 which, when energized, causes the valve to cut off communication between a suitable source of fluid pressure 11 and the cylinder 5, which, when de-energized, allows the valve to establish communication between a source of fluid pressure 11 and the cylinder 5. An electromagnetically operated release valve 12 is also provided for controlling the fluid pressure in the cylinder 5. This valve 12 has an operating winding 13 which, when energized, causes the valve to establish communication between the cylinder 5 and the atmosphere, and which, when deenergized, allows the valve to close and cut off this communication. Normally, the operating windings 10 and 13 of the valves 9 and 12, respectively, are energized so that the cylinder 5 is connected to the atmosphere and the spring 7 maintains the piston 6 in its lowest position, in which position the movable contact 7' is out of engagement with the fixed resistor 8.

Each of the other vehicles constituting the multiple unit train may be equipped with a similar eddy current braking system.

For controlling the energization of the electromagnetically operated valves 9 and 12, on each of the vehicles, we provide a suitable brake controller 14 and a pressure regulating relay 15 controlled thereby which is usually located on the first vehicle of the train. One or more of the other vehicles may be provided with a similar brake controller and pressure regulating relay, but only one such controller is operated at any given time to control the braking system of the train. As shown in the drawing, the controller 14 includes a rotatable contact member 16 which is arranged to be rotated in a clockwise direction by a suitable operating member, such as a foot pedal 17, against the bias of a suitable spring 18. In its normal or released position, the movable contact 16 engages a stationary contact 19 to complete an energizing circuit through train conductor T—1 for the operating windings 10 and 13 of the electromagnetically operated valves 9 and 12, respectively on each of the vehicles. When the movable contact 16 is rotated in a clockwise direction from its normal position, it disengages the stationary contacts 19 to de-energize the operating windings 10 and 13, and successively engages the stationary contacts 20 associated with the rheostat 21 and continuously engages the stationary contact 22. When the contact 16 is in engagement with the contact 22, a circuit is completed through train wire T—2 for the windings 23 and 24 of the regulating relay 15 on each of the vehicles, and when the contact 16 is in engagement with any of the contacts 20 associated with the rheostat 21, a circuit is completed through train wire T—3 for the winding 25 of the relay 15 on each of the vehicles and a portion of the rheostat 21 depending upon the position of the contact 16. The rheostat 21 is so connected in the circuit of each relay winding 25 that clockwise rotation of the movable contact 16 inserts resistance in the circuit of each relay winding 25 to decrease the current through this winding.

In series with the winding 23 of each relay 15 is an adjustable rheostat 26 which is installed on the respective vehicle and which is controlled in any suitable manner, examples of which are well known in the art, so that the amount of resistance in the circuit of the associate relay winding 23 varies directly with the load on the vehicle on which it is installed. As shown in the drawing, the movable arm 27 of the rheostat 26 is connected to a lever 28 pivoted at one end to a suitable member 29 of the vehicle, the position of which does not vary with the load on the vehicle, and the other end of which is held by a suitable biasing means, such as a spring 29', against a member 30 of the vehicle, the position of which does vary with the load on the vehicle.

Each regulating relay 15 is also provided with a fourth winding 31, which is connected in series with the energizing winding 3 of the eddy current brake 1. The four windings 23, 24, 25, and 31 are arranged so that they act cumulatively to lift the movable contact 32 against the action of a suitable spring 33. When the total pull exerted by the four windings equals or exceeds a predetermined value, the contact 32 engages a stationary contact 34 to complete an energizing circuit for an operating winding 35 of the electromagnetically operated application valve 9. When the total pull of the four windings is less than this predetermined value, the spring 33 maintains the contact 32 below the stationary contact 34, and when the pull is above this predetermined value, the movable contact 32 is also in engagement with a stationary contact 36, thereby completing an energizing circuit for an operating winding 37 of the electromagnetically operated release valve 12.

In order to prevent overshooting of the rheostat 4, we provide a suitable antihunting arrangement which consists in connecting the operating windings 35 and 37 of the application and release valves respectively so that the energizing circuit of each of these relays includes a common impedance 40. The winding 24 of the regulating relay 15 is also connected to this common impedance 40 so that the current that flows through the winding 24 flows through a portion or all of the impedance 40.

The operation of the arrangement shown in Fig. 1 is as follows: When the eddy current brake is released, the braking apparatus is in the position shown in the drawing. The movable contact 16 of the brake controller 14 is in engagement with the stationary contact 19 so that the winding 10 of the valve 9 is energized to maintain the valve closed, and the winding 13 of the valve 12 is energized to maintain this valve open and thereby connect the cylinder 5 to the atmosphere.

When it is desired to make an application of the eddy current brake, the foot pedal 17 is depressed a predetermined amount depending upon the amount of braking desired. If a small amount of braking is desired, the foot pedal is depressed only a small amount, whereas if it is desired to effect a very rapid retardation of the vehicle, the foot pedal is depressed its maximum amount. As soon as the movement of the foot pedal has caused the movable contact 16 to disengage the stationary contact 19, the windings 10 and 13 are de-energized. The valve 9 then opens to establish communication between the source of fluid pressure 11 and the cylinder 5, and the valve 12 closes to cut off communication between the cylinder 5 and the atmosphere. Pressure then starts to build up in the cylinder 5 and causes the piston 6 to move upwardly so that the movable contact 7' engages the resistor 8 and completes a circuit through the winding 3 of the eddy current brake 1 and the winding 31 of the regulating relay 15. As the pressure in the cylinder 5 continues to increase, the contact 7' continues its upward movement so as to cut out resistance in the circuit of the windings 3 and 31, thereby increasing the energization thereof and causing the braking effect produced by the eddy current brake 1 to increase.

As soon as the operation of the foot pedal 17 causes the movable contact 16 to engage the stationary contact 19 of the controller 14, a circuit is completed through the windings 23 and 24 of the regulating relay 15. Since the adjustable resistor 26 is connected in series with the winding 23, the energization of this winding varies inversely with the load on the vehicle. Also, the movable contact 16 completes an energizing circuit for the winding 25 of the relay 15 through the adjustable rheostat 21 of the controller 14, the amount of current in this circuit being dependent upon the extent to which the movable contact 16 is moved by the operator. The four windings 23, 24, 25 and 31 of the relay 15 act cumulatively to lift the movable contact 32 against the opposing force exerted by the spring 33. When the operator first moves the foot pedal to the brake application position and thus effects the energization of the windings 23, 24, and 25, the pull exerted by these three windings is not sufficient to lift the movable contact 32. However, as soon as the braking effect produced by the eddy current brake reaches a predetermined amount, as indicated by a predetermined current through the winding 31, the pull exerted by the four windings of the relay 15 becomes sufficient to lift the contact 32 so that it engages stationary contact 34. A circuit is then completed through the impedance 40 for the operating winding 35 of the application valve 9. Valve 9 then closes to cut off communication between the source of fluid pressure 11 and the cylinder 5.

Since the current that flows through the winding 35 and the impedance 40 produces a voltage drop across that portion of the impedance 40 which is also in series with the winding 24, this voltage drop reduces the current through the winding 24 so that the force exerted by the spring 33 is sufficient to open the contacts 32, 34. This causes the voltage drop across the impedance 40 due to the current through the winding 35 to disappear so that the energization of the winding 24 is restored to its normal value. The result of this arrangement is that a vibrating action of the relay 15 is produced while the last few pounds of fluid pressure are admitted to the cylinder 5. The braking effect then being produced by the eddy current brake is an amount which depends upon the position of the foot pedal 17 and the load on the vehicle. Since the energization of the winding 23 varies inversely with the load on the vehicle, it is evident that when the vehicle is heavily loaded, a much greater current is required through the winding 31 to lift the contact 32 into engagement with contact 34 in response to a given movement of the foot pedal 17, and consequently, a much greater braking effect is produced than is the case when the vehicle is lightly loaded. Similarly, since the winding 25 varies inversely with the extent to which the foot pedal 17 is depressed, it is evident that when the foot pedal is depressed a relatively large amount, with a given load on the vehicle, a much greater current is required through the winding 31 to lift the contact 32 into engagement with contact 34 and consequently a greater braking effect is produced than is the case when the foot pedal is depressed a small amount.

If, after the operator has effected a predetermined application of the eddy current brake 1, he desires to increase the braking effect, he merely depresses the foot pedal 17 further. This causes more of the resistance 21 of the controller 14 to be inserted in the circuit of the winding 25 so that the energization thereof is decreased, thereby allowing the spring 33 to move the contact 32 out of engagement with the contact 34. The winding 35 of the application valve 9 then becomes de-energized so that this valve opens and re-establishes communication between the source of fluid pressure 11 and the cylinder 5 until the braking effect is increased sufficiently to cause the winding 31 to be energized a sufficient amount to lift the contact 32 again into engagement with the contact 34.

When the operator desires to decrease the braking effect, he merely allows the foot pedal 17 to return towards its normal position so that the amount of the resistor 21 in the circuit of the winding 25 is decreased, thereby effecting an increase in the energization of the relay winding. This causes the pull exerted by the four windings of the relay 15 to increase so that the movable contact 32 in addition to engaging contacts 34, also engages the stationary contact 36, thereby effecting the energization of the operating winding 37 of the release valve 12 through the impedance 40. The valve 12 then opens to exhaust some of the fluid pressure in the cylinder 5 to the atmosphere so that the braking effect is decreased until the current through the winding 31 is decreased sufficiently to allow the spring 33 to move the movable contact 32 out of engagement with contact 36. Overshooting of the rheostat 4 is prevented since the opening of the circuit of winding 37 decreases the voltage drop across the impedance 40 and results in an increase in the energization of the winding 24 so that vibrating action of the relay 15 is produced just before the final pressure in the air cylinder 5 is reached.

When the operator desires to release the brakes entirely, he allows the foot pedal to return to its normal position, in which position the movable contact 16 engages the stationary contact 19 to complete the energizing circuit for the operating windings 10 and 13 of the application valve 9 and the release valve 12, respectively. Release valve 12 then opens and allows all of the fluid pressure in the cylinder 5 to exhaust to the atmosphere so that the spring 7 in the cylinder 5 causes the movable contact 7' to disengage the fixed resistor 8 and open the circuit of the winding 3 of the eddy current brake 1, thereby releasing the braking effect thereof entirely.

In Fig. 2, we have shown our improved regulating arrangement applied to a fluid pressure brake system instead of an eddy current brake system. In this Fig. 2, the braking effect is produced by admitting fluid pressure to a suitable brake pressure cylinder 41, which is arranged in a manner well known in the art, so that it applies a brake shoe against some rotating portion of the vehicle such as one of the wheels when fluid pressure is admitted to the brake cylinder. As shown in the drawing, the brake cylinder 41 is connected to the same pipe as the cylinder 5 so that the fluid pressure in both of these cylinders is always the same. Also, in the modification shown in Fig. 2, the piston 6 in the cylinder 5 is mechanically connected to the movable contact 32 so as to exert directly against this contact a force proportional to the pressure in the brake cylinder 41, and in a direction opposite to the force exerted by the spring 33.

Also since in some cases it is not necessary to prevent overshooting of the rheostat while the braking effect is being increased, we have not shown the winding 37 connected to the common impedance 40.

Since the arrangement shown in Fig. 2 is substantially the same as that shown in Fig. 1, its operation will be obvious from a description of the operation of the arrangement shown in Fig. 1.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States is:

1. In a vehicle braking system, means for producing a braking effect to retard the vehicle, a manually operated movable member having a predetermined braking range of movement, an electro-responsive regulating relay for controlling the braking effect of said first-mentioned means, and means for controlling the electric energization of said relay in accordance with the position of said movable member and the braking effect produced by said first-mentioned means and the load on said vehicle so that different braking effects dependent upon the load on the vehicle are produced and maintained by said first-mentioned means in each position of said movable member throughout its braking range of movement.

2. In a vehicle braking system, means for producing a braking effect to retard the vehicle, a manually adjustable brake device having a predetermined braking range of movement, a regulating device for controlling the braking effect of said first-mentioned means, and means for controlling the operation of said regulating device in accordance with the position of said brake device and the load on the vehicle and the braking effect produced by said first-mentioned means so that different braking effects dependent upon the load on the vehicle are produced and maintained by said first-mentioned means in each position of said brake device throughout its braking range of movement.

3. In a vehicle braking system, means for producing a braking effect to retard the vehicle, a manually adjustable brake device having a predetermined range of movement, and means jointly controlled by the position of said brake device and the load on the vehicle and the braking effect being produced by said first mentioned means for controlling said first mentioned means so that different braking effects dependent upon the load on the vehicle are produced and maintained by said first-mentioned means in each position of said brake device throughout its braking range of movement.

4. In a vehicle braking system, means for producing a braking effect to retard the vehicle, a regulating device including a movable member, means for exerting on said member in a predetermined direction a force which varies inversely with the load on the vehicle, means for exerting on said member in said predetermined direction a force which is variable at the will of the operator of the vehicle, means for exerting on said member in said predetermined direction a force which varies directly with the braking effect produced by said first mentioned means, and means exerting on said member a force in opposition to said other forces, and means controlled by said regulating device for effecting an increase in said braking effect when said opposing force exceeds the sum of said other forces and a decrease in said braking effect when said opposing force is less than the sum of said other forces.

5. In a vehicle braking system, means for producing a braking effect to retard the vehicle, a movable member, an electromagnet for exerting a force on said member in a predetermined direction, means for varying the energization of said electromagnet inversely as the load on the vehicle varies, means for manually controlling the energization of said electromagnet, means for exerting on said member in said predetermined direction a force proportional to the braking effect being produced by said first mentioned means, means for exerting on said member a predetermined force in the opposite direction, and means controlled by the position of said member for varying the braking effect produced by said first mentioned means.

6. In a vehicle braking system, an eddy current brake having a magnetizing winding, a regulating device for said brake including a movable member, an electromagnet for exerting a force on said member in a predetermined direction, means for varying the energization of said electromagnet inversely as the load on the vehicle varies, means for manually controlling the energization of said electromagnet, means for exerting on said member a predetermined force in the opposite direction, an energizing winding on said electromagnet, a circuit including said magnetizing and energizing windings, and means controlled by said regulating device for varying the current in said circuit.

7. In a vehicle braking system, a fluid pressure cylinder, a regulating device including a movable member, means controlled by the position of said movable member for controlling the supply of fluid pressure to and the release of fluid pressure from said cylinder, a brake controller including an operating means having a predetermined braking range of movement, and means for controlling the position of said movable member so that different fluid pressures dependent upon the load on the vehicle are maintained in said cylinder in each position of said operating means throughout its range of movement including means for exerting on said movable member a force which is variable at the will of the operator of the vehicle, means for exerting on said movable member a force which varies with the load on the vehicle, and means for exerting on said movable member a force varying with the fluid pressure in said cylinder.

8. In a vehicle braking system, a fluid pressure cylinder, a regulating device including a movable member, means controlled by the position of said movable member for controlling the supply of fluid pressure to and the release of fluid pressure from said cylinder, a brake controller including operating means having a predetermined braking range of movement, and means for controlling the position of said movable member so that different fluid pressures dependent upon the load on the vehicle are maintained in said cylinder in each position of said operating means throughout its range of movement including means for exerting on said movable member a predetermined force in a predetermined direction, and means for exerting on said movable member in the opposite direction a force which varies inversely with the load on the vehicle and a force which is variable at the will of the operator of the vehicle and a force which varies directly with the pressure in said cylinder.

9. In a vehicle braking system, means for producing a braking effect to retard the vehicle and means for controlling the braking effect produced by said first mentioned means including a regulating relay, means for manually controlling the energization of said relay, means for controlling the energization of said relay in accordance with the braking effect being produced by said first mentioned means, and antihunting means for controlling the energization of said relay.

10. In a vehicle braking system, means for producing a braking effect to retard the vehicle and means for controlling the braking effect produced by said first mentioned means including a regulating relay, means for controlling the energization of said relay in accordance with the load on the vehicle, means for manually controlling the energization of said relay, means for controlling the energization of said relay in accordance with the braking effect being produced by said first mentioned means, and antihunting means for controlling the energization of said relay.

11. In a vehicle braking system, a fluid pressure cylinder, a magnet for controlling the amount of fluid pressure in said cylinder, a regulating device including a movable member, a solenoid for exerting a force on said member, an impedance, an energizing circuit for said solenoid including said impedance, manually controlled means for varying the current through said energizing circuit, means for exerting on said member a force varying with the amount of fluid pressure in said cylinder, means controlled by said movable member when the total force exerted on said member is above a predetermined amount for completing an energizing circuit for said magnet through said impedance.

STEPHEN J. VOUCH.
JACOB W. McNAIRY.